Jan. 26, 1965

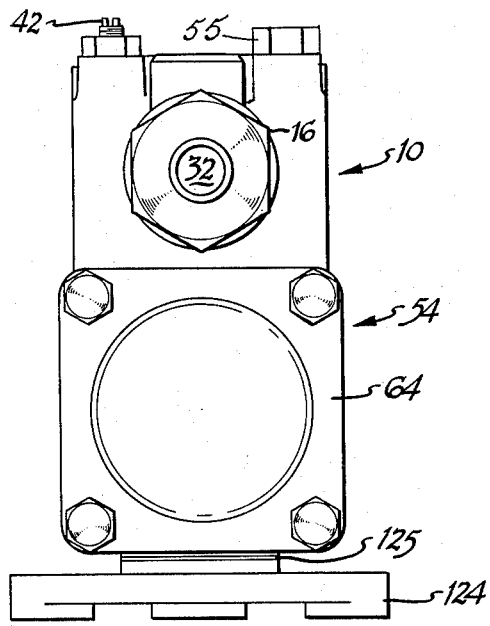
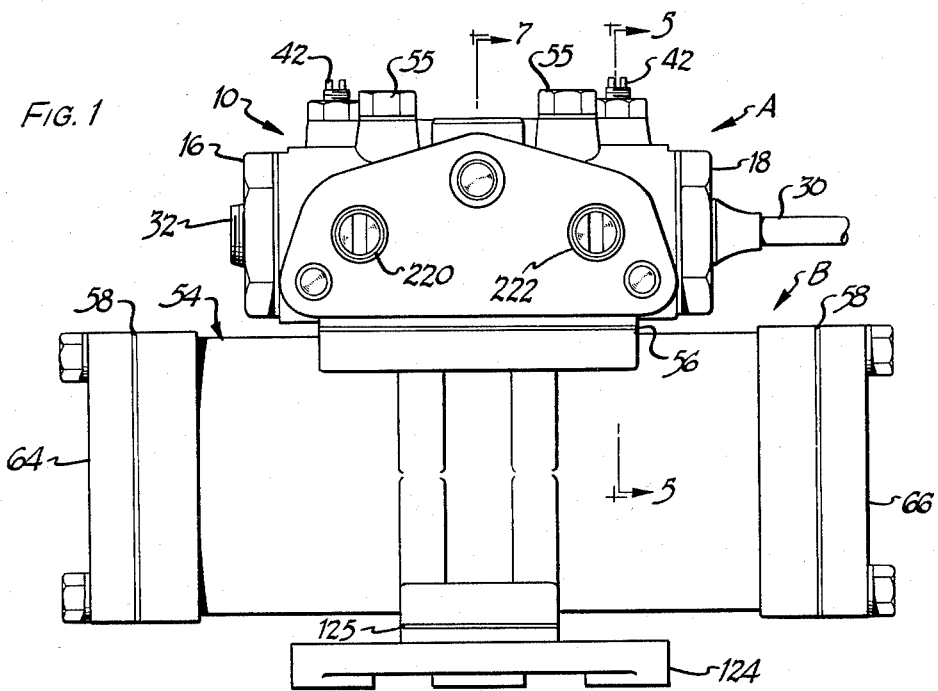

C. H. NICKELL 3,167,083

SEQUENCE VALVE

Filed Sept. 5, 1961

INVENTOR.
CLAUDE H. NICKELL
BY
WILSON, SETTLE & CRAIG
ATTORNEYS

Jan. 26, 1965 C. H. NICKELL 3,167,083
SEQUENCE VALVE
Filed Sept. 5, 1961 5 Sheets-Sheet 4

INVENTOR.
CLAUDE H. NICKELL
BY
WILSON, SETTLE & CRAIG
ATTORNEYS

Jan. 26, 1965

C. H. NICKELL 3,167,083

SEQUENCE VALVE

Filed Sept. 5, 1961

INVENTOR.
CLAUDE H. NICKELL
BY
WILSON, SETTLE & CRAIG
ATTORNEYS

United States Patent Office 3,167,083
Patented Jan. 26, 1965

3,167,083
SEQUENCE VALVE
Claude H. Nickell, 17809 Oakwood Blvd., Dearborn, Mich., assignor of fifty percent to Peninsular Distributing Company, Detroit, Mich.
Filed Sept. 5, 1961, Ser. No. 135,821
8 Claims. (Cl. 137—104)

This invention relates to a device operated by fluid under pressure for actuating a member to control the elapsed time required for the completion of a time cycle or the control of a sequence of operations.

In the control of many types of mechanical and other devices it is necessary that the time required to perform a given operation or sequence of operations be accurately controlled in accordance with a timed sequence.

I have found that it is possible to provide an accurate time control mechanism responsive to the rate of the flow of a fluid through a calibrated orifice to control the rate of movement of a piston by the metered fluid.

An object of my invention is therefore to provide a fluid pressure actuated device wherein a valve is employed to selectively direct the flow of pressurized fluid through calibrated orifices to selectively move a piston assembly in opposite directions, a reversing mechanism actuated by the piston assembly being employed to reverse the position of the fluid directing valve to reverse the direction of fluid flow to move the piston assembly in opposite directions.

A more specific object of my invention resides in the provision of a valve spool for directing fluid under pressure to spaced portions of a slidably mounted piston assembly, the valve spool being controlled by a linkage actuated by movement of the piston assembly to extreme positions of its range of movement.

Another object of my invention resides in the provision of a control mechanism actuated by pressurized fluid and wherein a piston is subjected to fluid pressure on the opposite ends, the movement of the piston being responsive to the differential pressure to which its opposite ends are subjected to insure smooth movement of the piston.

A further object of my invention is to provide a control mechanism wherein, when the device is operating, a piston assembly is at all times held in a suspended state between fluid subjected to different pressures and exerted on opposite ends thereof to prevent fluttering, and to minimize strains exerted on and deflections in seal members thereby increasing the accuracy, efficiency and life of the assembly.

Still a further object of my invention resides in the provision of an automatic fluid pressure actuated unloading valve for controlling one-way flow of fluid to vary the time required for the completion of a full stroke by varying the rate of flow of fluid under pressure from the fluid motor.

Yet a further object of my invention is to provide an improved control mechanism wherein controlled metering valves and automatic unloading one-way valve assemblies are associated with opposite ends of a fluid motor in such a manner that the rate of movement of the motor assembly is controlled by the relative position of the metering valve at one end of the motor assembly in relation to the unloading valve at the opposite end of the motor assembly.

Yet a still further object of my invention is to provide a fluid pressure operated timing device wherein adjustable controls are provided to vary the time required to complete a cycle of movement of a control member.

Another object resides in the provision of control mechanism actuated hydraulically and having an adjustable metering member to control the operation of the device.

A further object of my invention is to provide a valve actuating linkage, controlled by movement of a fluid motor and wherein the linkage actuated by the fluid motor shifts an over-center mechanism beyond the centralized position just as the valve is moved to the completely closed position by the linkage.

Another object resides in the provision of a fluid pressure operated control wherein a shiftable valve spool directs fluid under pressure to a fluid motor and the fluid motor in turn controls the position of the valve spool and supplies fluid under pressure to a circuit operably connected to perform work.

A further object of my invention resides in the provision of a novel fluid motor having a movable member operably connected to a valve spool which directs fluid under pressure to selectively operate the fluid motor in a desired direction, and wherein the position of the valve spool controls the operation of the fluid motor and the positioning of any desired number of valve members operable to control independent fluid circuits.

Other objects of this invention will appear in the following description and appended claims, reference being had to the accompanying drawings forming a part of this specification wherein like reference characters designate corresponding parts in the several views.

In the drawings:

FIGURE 1 is a side elevational view of a device embodying my invention;

FIGURE 2 is an end elevation thereof;

FIGURE 8 is a fragmentary sectional view illustrating the control member in a centralized position wherein the detent member employed to insure positive movement of the control member is shown in the fully depressed position.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

*Broad aspect*

Broadly, as shown in FIGURES 1 and 2, the present invention relates to a sequence timing valve wherein a fluid directing valve mechanism is housed within a valve casing A secured to an associated cylinder housing B that has a pair of aligned cylinders contained therein. Piston assemblies are slidably mounted within the cylinders and are actuated by fluid from the valve mechanism, which is in turn controlled by the piston assemblies.

Thus, filling of one cylinder is controlled to a certain time period and filling of the other cylinder is controlled to either an identical or differing time period as desired, for very accurate, highly flexible and versatile operation of an associated fluid motor, utilizing the hydraulic system of the fluid motor itself; thus separate control mechanisms of complex structure such as electronic devices or the like, commonly utilized in hydraulic presses, hydraulic motors and similar equipment operating on timed sequence operations, are completely eliminated.

Concise description

At the outset, it should be made clear that the valve casing A has an identical set of valves at each end. Each set of valves includes an inlet fluid metering valve and a fluid outlet check valve. The associated cylinder and piston housing B includes two piston and cylinder units wherein the cylinders are aligned and the pistons are interconnected for simultaneous movement. Each set of valves in the housing A cooperates with one of the cylinder and piston units in housing B to admit fluid to drive the piston in first one direction and then in the other direction.

Broadly, the operation provides that the inlet valve on one end permits fluid to flow into its corresponding cylinder at a metered rate and fluid in the other cylinder is simultaneously exhausted reversely through its metering valve and also through its check valve. Reverse operation returns the piston by admitting fluid to the other cylinder through its metering valve and exhausting from the one end through its metering valve and check valve.

Figure 3:
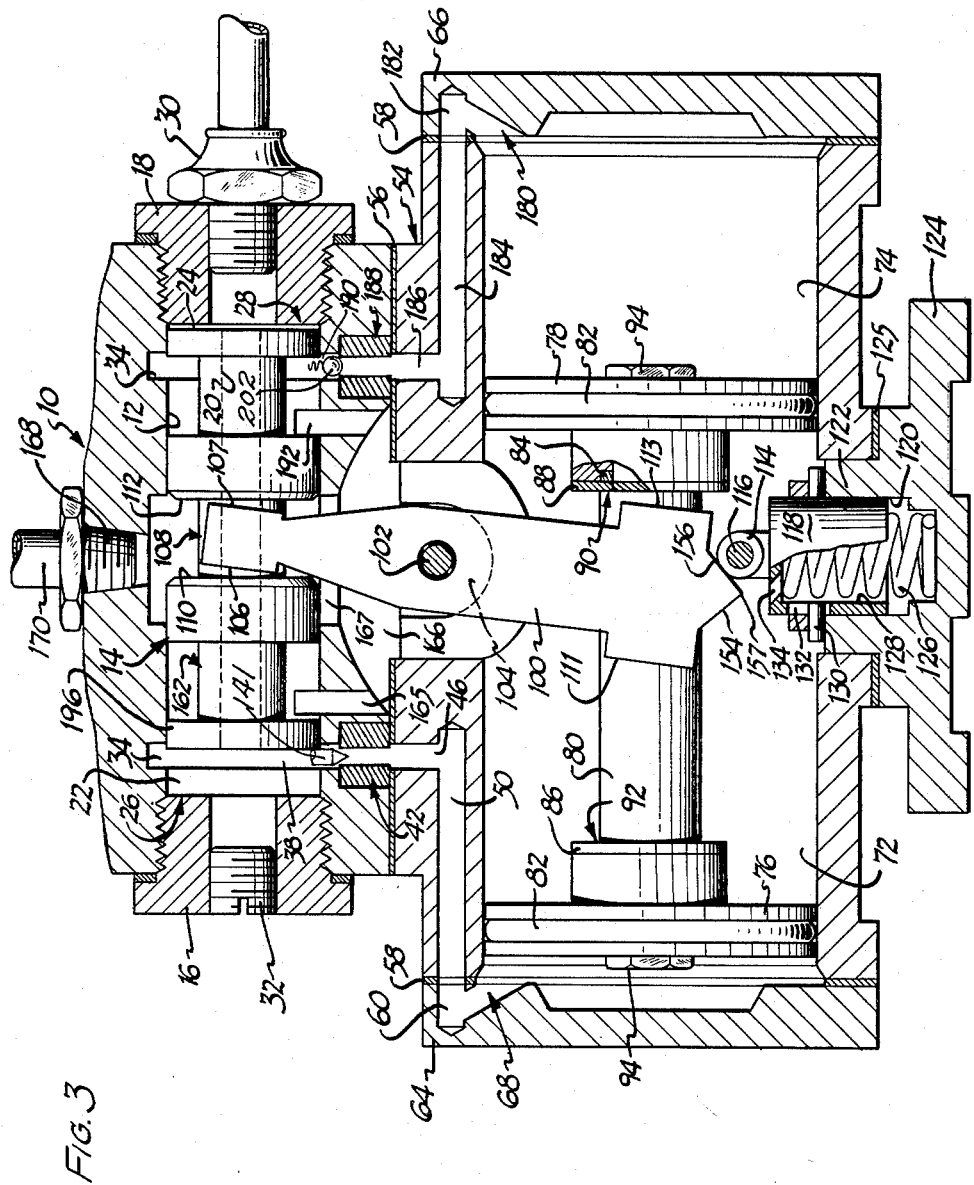
FIGURE 3 is a longitudinal sectional view of the device illustrated in FIGURES 1 and 2, shown with the valve spool in the right-hand position at which time fluid under pressure will be directed to be exerted on the piston in the left-hand cylinder of the fluid motor.
Figure 4:
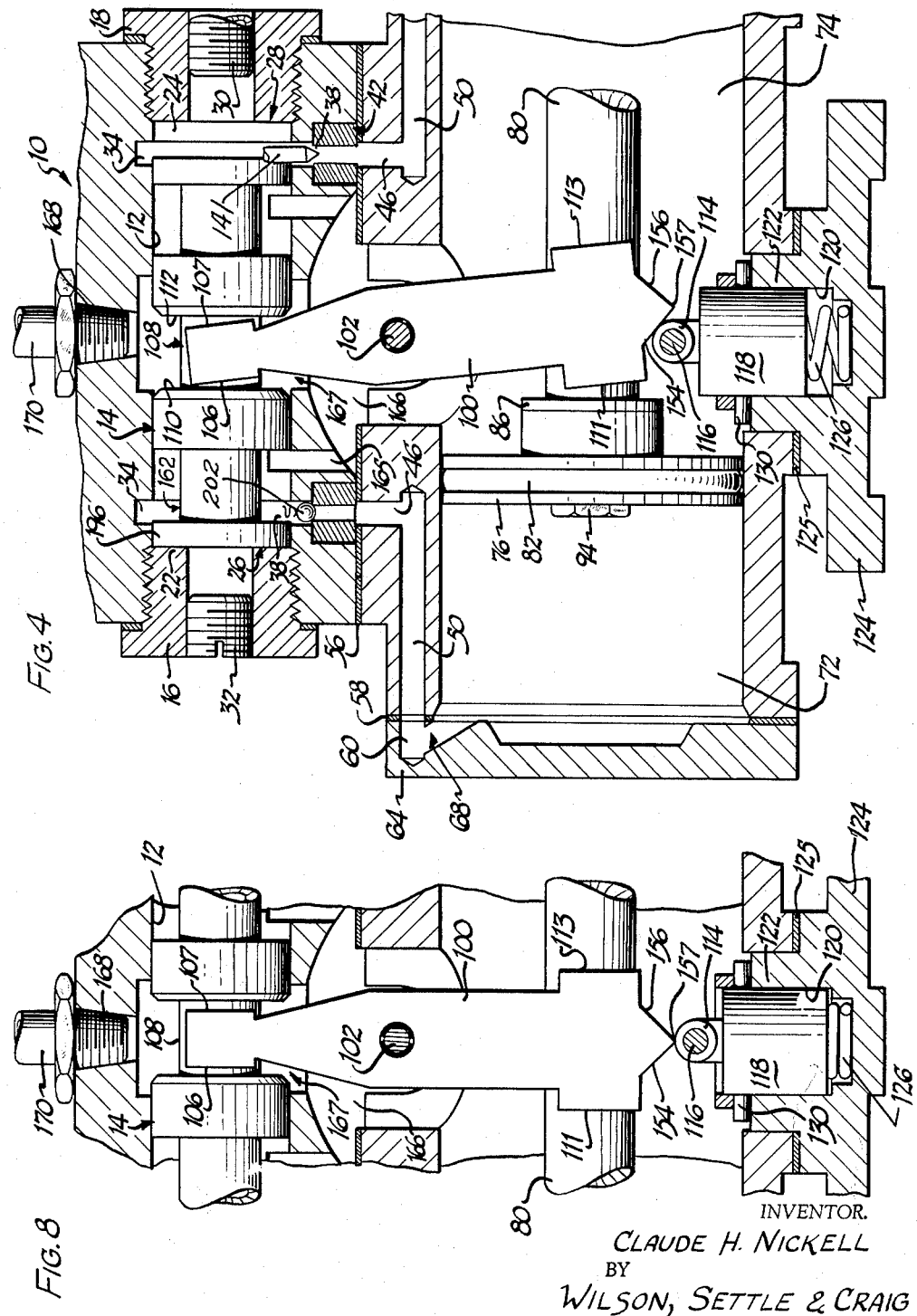
FIGURE 4 is a view similar to FIGURE 3 illustrating the valve spool in the left-hand position at which time fluid under pressure will be directed to be exerted on the piston in the right-hand cylinder of the fluid motor.

The following explanation will be made clearer by noting that FIGURES 3 and 4 are staggered sectional views. FIGURE 3 is taken at the left end through an inlet metering valve and at the right end through an outlet check valve to show flow into the metering valve and out through the check valve. FIGURE 4 is a sectional view with the right hand end taken through an inlet metering valve and the left hand end also through a metering valve to show flow in through a metering valve and also reverse flow out the opposite cylinder through a metering valve.

Thus the two views illustrate the operation of the valve sets wherein fluid is admitted only through metering valves, but is exhausted by return both through the metering valve to keep it clean, and also through a check valve which provides a desired, but low back pressure for smooth operation.

The valve casing and cylinder body

Referring now to FIGURES 3 and 4 it will be noted that a valve body 10 has a longitudinal bore 12 for the reception of a slidable valve spool 14, opposite ends of the bore 12 being provided with symmetrical fittings 16 and 18. The valve spool 14 is provided with a central longitudinally extending bore 20 to permit fluid under pressure to flow therethrough to chambers 22 and 24 at the opposite ends of the bore 12 between opposite ends of the valve spool 14 and the fittings 16 and 18 respectively. These fittings 16 and 18 have inner faces 26 and 28 which function to limit longitudinal movement of the valve spool 14 in opposite directions in the bore 12.

Fluid under pressure may be admitted to the bore 12 through either or both of the fittings 16 and 18. However, as shown in FIGURES 1, 3 and 4, a conduit 30 is secured in the fitting 18 only, to admit fluid under pressure to bore 20 of valve spool 14 to subject the chambers 22 and 24 to pressurized fluid; as shown, a plug 32 is employed to close the opposite fitting 16.

The bore 12 is provided, adjacent its opposite ends with circumferential grooves 34 which communicate respectively through cross passages 38 with metering valves 42 in the valve body 10 and thence with passageways 46 that intersect longitudinal passages 50 formed in a cylinder housing 54. The valve body 10 is secured to the housing 54 in any desired manner as by screws 55, FIGURE 1, a suitable gasket 56 preferably being interposed therebetween.

Passages 50 extend through cylinder head gaskets 58 and communicate with passages 60 formed in cylinder heads 64 and 66. Ports 68 in the heads 64 and 66 intersect the passages 60 and communicate with the bores of cylinders 72 and 74 in the housing 54.

Piston assemblies

Slidably mounted within the cylinders 72 and 74 are a pair of piston assemblies 76 and 78 secured to a piston rod 80. Each of the piston assemblies 76 and 78 is provided with a suitable seal 82, FIGURES 3 and 4, to seal the space between the outer surfaces of the pistons 76 and 78 and the inner bores of the cylinders 72 and 74 respectively.

The pistons 76 and 78 are secured to the rod 80 in fluid tight relation. For example the inner bore of the piston assemblies 76 and 78 may be provided with suitable seals 84, FIGURE 3, engaging the piston rod 80 to securely seal the space between the piston assemblies and the piston rod 80. The piston assemblies 76 and 78 are secured in abutting relation with thrust plates 86 and 88 which engage suitable shoulders 90 and 92, FIGURE 3, formed on each end of the piston rod 80. Suitable nuts 94 are employed to clamp the piston assemblies 76 and 78 to the rod 80 in fluid tight relation.

The piston and rod assembly 76-78-80 is freely slidable in the cylinders 72-74, and may be moved in opposite directions therein by fluid under pressure admitted selectively to the cylinders 72 and 74 through the above-described fluid passages.

As previously mentioned, when fluid under pressure is admitted under metered flow conditions to one of the cylinders 72 or 74 to exert a force to move the piston assemblies 76-78-80, fluid is trapped in the opposite cylinder and the trapped fluid is exhausted therefrom through the same metering valve whence it came and also through fluid-pressure actuated relief valves or check valves to provide a cushioned suspension to stabilize the movement of the piston and rod assembly and to prevent flutter or erratic movement thereof.

Valve actuating levers

Figure 7:
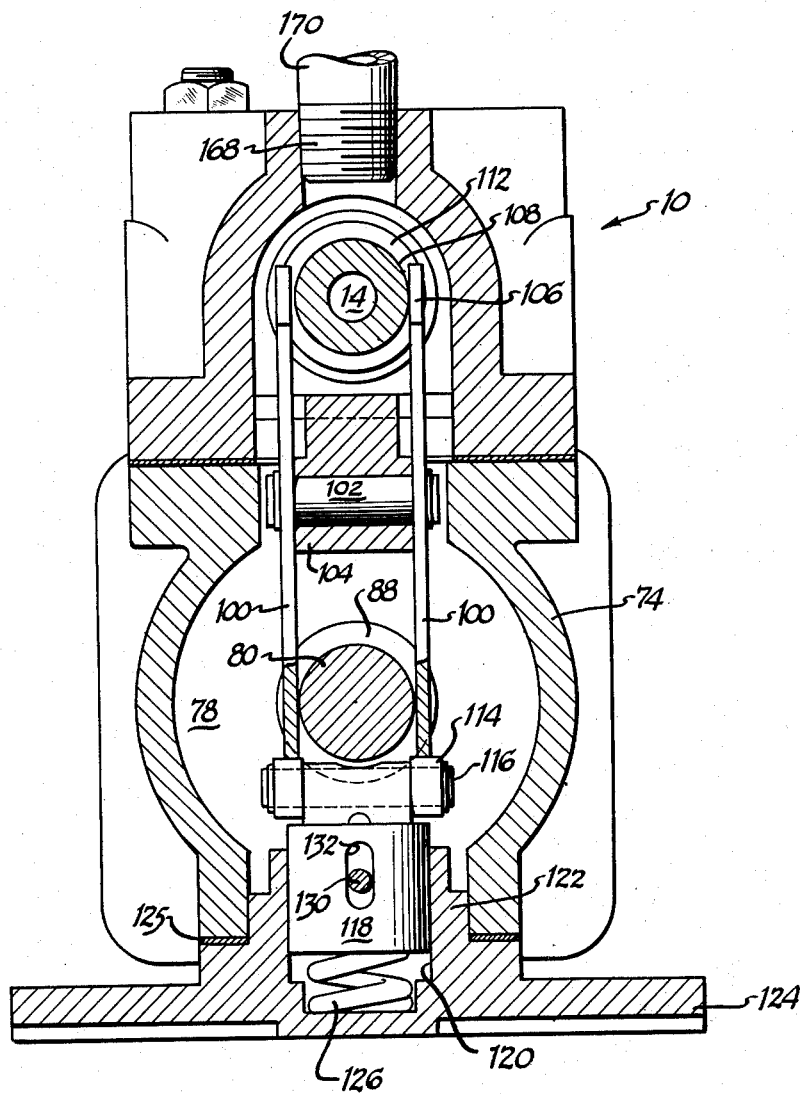
FIGURE 7 is a sectional view taken substantially on the line 7—7 of FIGURE 1 looking in the direction of the arrow.

As shown in FIGURES 3, 4 and 7, it will be noted that a pair of symmetrical valve actuating levers 100 are pivotally mounted on an axle or pin 102 journaled in a projecting boss 104 of the valve body 10. The upper ends of the levers 100 preferably have parallel side walls 106-107 that are adapted to be received within a groove formed by restricted portion 108 formed in the valve spool 14. Spaced shoulders 110 and 112 formed in the valve spool 14 at the ends of restricted portion 108 are provided to be engaged by the side walls 106 and 107 of the upper ends of the levers 100 to shift the valve spool 14 axially within the bore 12 between extreme right- and left-hand positions as shown in FIGURES 3 and 4 when the levers 100 are oscillated about the axle or pin 102.

The actuated portions of the levers 100 beneath the axle or pin 102 are provided preferably with parallel side walls 111 and 113 to be engaged by the thrust plate members 86 and 88 carried by the piston rod 80 to shift the levers 100 about the pin 102 as the piston and rod assembly 76-78-80 is shifted back and forth in the cylinders 72 and 74.

The parallel sides 106 and 107 of the actuating portions of the levers 100 and the parallel sides 111 and 113 of the actuated portions thereof provide an improved snap action for the present valve to insure positive motion of the valve spool 14 from one extreme position to the other to prevent stalling of the device; this will be described later under the heading Operation summary.

In connection with the levers 100, it is to be included within the scope of this disclosure to combine the two levers 100 into a single lever with bifurcated ends.

Alternate lever construction

It will be apparent that, if desired, the actuating portions 106 and 107 at the upper ends of the levers 100 and the actuated portions 111 and 113 thereof may be provided with arcuate surfaces of a radius substantially equal respectively to the distance from the center of the pin 102 to the center of the valve spool 14, and the distance between the center of the pin 102 and the center of the piston rod 80 respectively. Such an embodiment is to be included within the scope of the invention.

The lever cam surfaces and detent cylinder

The lower ends of the levers 100 are provided with angularly related cam surfaces 154 and 156 merging at a point 157 and adapted to engage a pair of laterally spaced rollers 114 rotatably mounted on a pin 116 carried by a detent piston 118; the piston 118 is slidably mounted in bore 120 formed in an upstanding cylinder 122 carried by a base casting 124. A spring 126 positioned in a bore 128 of the detent piston 118 yieldingly urges the detent piston 118 to maintain the rollers 114 in contact with one or the other of the angularly related cam surfaces 154 and 156 at the lower ends of the valve actuating levers 100. A keeper pin 130 carried by the cylinder 122 and engaging in a slot 132 formed in the detent piston 118 is employed to maintain the detent piston in assembled relation with the base casting 124 when the base casting is removed from the cylinder housing 54. A gasket 125 is used to seal between base casting 124 and cylinder housing 54, with suitable means such as bolts being used to provide assembly.

Vent passages 134 are formed in the detent piston 118 to vent the space within the detent piston to the space between pistons 76 and 78. This space is constantly filled with oil to provide lubrication of the piston 118 and stabilize movement of the cylinder-piston assembly 76-78-80, as previously mentioned.

The metering valve

Figure 5:
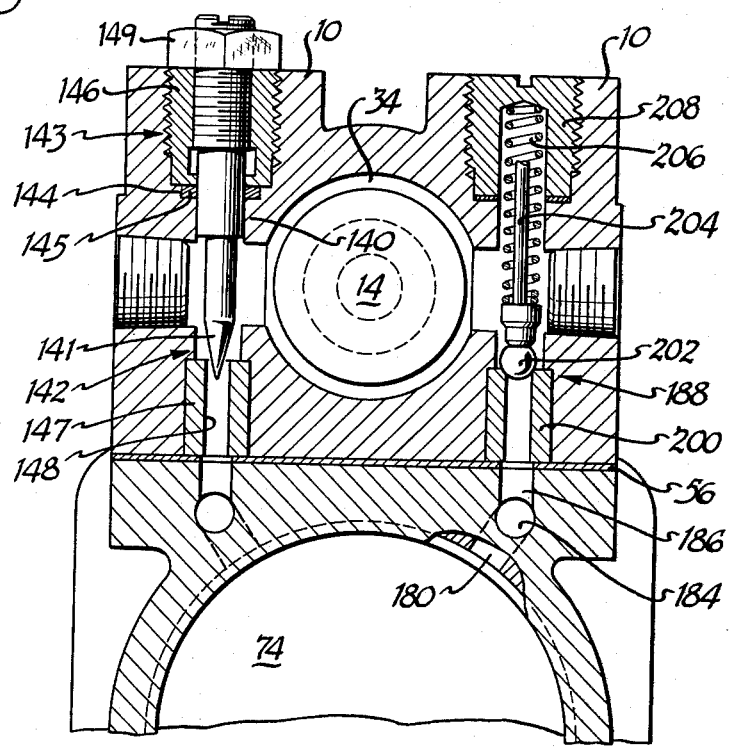
FIGURE 5 is a sectional view taken substantially on the line 5—5 of FIGURE 1 looking in the direction of the arrows.

As shown in FIGURE 5, one form of metering valve applicable to use in this invention utilizes an elongated pin 140 having a tapered point 141. The valve body 10 is provided with a passage 142 which is machined to provide a threaded counterbore 143 having a shouldered annular groove 144 at the bottom for an O-ring 145. A threaded annular plug 146 is turned into the counterbore 143 against the shoulder of groove 144 to retain the O-ring 145 in position.

The upper end of the metering pin 140 is externally threaded to mate with the internal thread of plug 146 into which the pin is turned. A bushing 147 is provided at the other end of the passage 142 and the point 141 of the pin 140 is suitably positioned in the bore 148 thereof to provide selected fluid flow. A lock nut 149 is turned onto the exposed end of pin 140 to provide fixed settings.

From the foregoing it will be observed that the metering valve structure illustrated in FIGURE 5 is of the adjustable type.

Alternate metering valve

Figure 6:
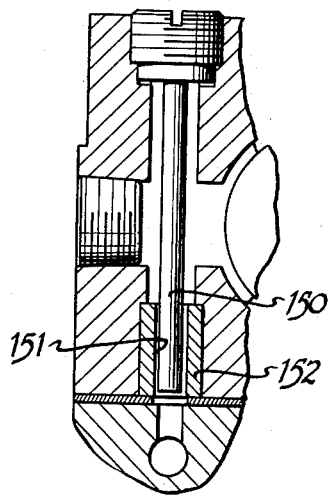
FIGURE 6 is a fragmentary sectional view illustrating a modified form of metering device wherein a fixed orifice bleed member is employed as a replacement for the adjustable metering pin.

Referring to FIGURE 6, an alternate form of metering valve is shown. This metering valve is of the fixed flow type, and utilizes a metering pin 150 of selected and constant diameter, working within an orifice 151 of selected diameter in a bushing 152. Although, with a given metering pin in position, a fixed flow is provided in this alternate form of metering valve structure, it will be obvious that by replacing the metering pin 150 with another of differing diameter, various flow rates through this valve can be achieved.

If desired the temperature of the fluid can be controlled as by the use of thermostatically controlled heaters or coolers to maintain the temperature of the fluid substantially constant to prevent fluctuation of the viscosity of the fluid which would cause a variation of the time required to fill the cylinders 72 and 74. Also it will be apparent that the pressure of the fluid may be maintained substantially constant to insure substantially uniform time periods to successively fill the cylinders 72 and 74 to move the actuating levers 100 through their cycle of operation.

Also, thermostatic control can be applied to the metering valve of FIGURE 5 to compensate for temperature changes, if desired.

Check valve system

As shown in FIGURE 3, when the cylinder 72 fills with fluid the piston and rod assembly 76-78-80 is moved toward the right by the force exerted by the fluid on the piston 76.

In order for the piston and rod assembly 76-78-80 to move toward the right in response to the force exerted by fluid entering the left-hand cylinder 72 it is necessary that fluid be controllably exhausted from the right-hand cylinder 74. In like manner, as shown in FIGURE 4, when the piston and rod assembly is moving to the left in response to force exerted on the piston 78 by fluid in the cylinder 74, it is necessary that fluid be controllably exhausted from the left-hand cylinder 72.

The trapped fluid in the cylinder toward which the piston and rod assembly is moving is permitted to escape partially by flowing in the opposite direction through the metering valve by which it entered and partially through exhaust check valves. The flow of fluid in the reverse direction through the metering system is specifically designed to keep the metering valves clean whereby uniform action over extended periods of time is insured.

FIGURE 4 typically illustrates the exhaust of fluid out of cylinder 72 by reverse flow through the ports 68 and passage 60 of the left hand cylinder head 64, and passages 50 and 46 of housing 54 that communicate with metering valve 42 in the valve body 10. From metering valve 42, fluid flows back through passage 38 around restricted portion 162 of spool 14, thence through passage 165 to chamber 166 in valve body 10. The chamber 166 communicates with a chamber 167 around the reduced central portion 108 of spool 14 and an outlet 168 to a conduit 170 that leads to a sump (not shown) of the fluid supply system.

In accordance with the invention a check valve system is also provided to permit trapped fluid to escape at a more rapid rate from the cylinder into which the piston assembly is moving than is permitted by the reverse flow through the metering valves alone. By this expedient the cylinder into which the piston assembly is moving is maintained under a desired low degree of fluid back pressure to insure smooth movement of the piston assembly. As typically illustrated in FIGURES 3 and 5, the check valve system includes a series of passages extending between the grooves 34 of the bore 12 in the valve body 10 and the cylinders 72 and 74 respectively in the cylinder housing 54.

Thus a port 180, FIGURE 3, is provided in cylinder head 66, which connects with a passage 182 through the gasket 58 to passage 184 of body 54. A cross passage 186 connects passage 184 through gasket 56 to check valve 188. From check valve 188 a passage 190 leads into an annular space surrounding reduced portion 162 of spool 14 that bridges passage 190 and a passage 192 leading back out through housing 10 to the chamber 166. Chamber 166 is connected to outlet 170, as previously described.

As shown in FIGURE 5 it will be noted that each check valve 188 has an orificed sleeve 200 against which a ball 202 is pressed by a plunger 204 yieldingly urged by a spring 206. The spring 206 is seated in a cup 208 threaded into the valve body 10 to permit varying the force exerted by the spring.

By referring to FIGURE 5 it will be observed that metering valve pin 140 and check valve 188 are connected in common fluid receiving relation to groove 34 of valve spool 14 and that it would appear, since fluid flows through the metering valve to a cylinder and then back up through port 180 to the other side of ball 202, that the check valve might be opened to let fluid escape. However, it will be observed that the surface area of ball 202 above its seat is greater than the surface area within the seat; therefore, with the pressure of spring 206 and the downward fluid pressure opposing the upward fluid pressure, the check valve is kept closed during entry of fluid. However, when fluid is exhausted from the cylinder, fluid pressure on the outlet side of the ball is less than cylinder pressure and thus the ball is moved away from its seat to open the valve.

Referring now to FIGURE 4 it will be noted that when the mechanism is reversed, at which time the valve spool 14 will have been shifted to the left-hand end of the bore 12, fluid under pressure will be admitted to the cylinder 74 to move the piston and rod assembly 76–78–80 toward the left in the cylinders 72–74. Thus fluid under pressure will be admitted from the chamber 24 at the right-hand end of the valve spool 14 through the cross bore 38, flow metering valve 42, passageway 46, 50 and 60 and port 68 to exert a force on the piston 78 to urge it toward the left.

Fluid trapped in the cylinder 72 will be forced by the piston 76 to flow reversely through the interconnected passageways of its metering valve assembly 42 to flush it and maintain it in a clean condition.

Fluid will also flow from the cylinder 72 through the passageways having pressure responsive check valve 188 therein. This is illustrated by reference to the right hand side of FIGURE 3 wherein the check valve exhaust system is illustrated, this being the same as the check valve exhaust system associated with the left hand end of FIGURE 4. Thus flow is through a port 180, passages 182, 184 and 186 to check valve 188, thence through the bridging gap formed by the reduced portion 162 of spool 14 to reverse passage 192, chambers 166, 167 and thence to outlet 168 to sump conduit 170.

*Operation summary*

As previously mentioned, valve spool 14 is shifted from one extreme position to the other to reverse the direction of flow of fluid to the cylinders 72 and 74 by the actuating levers 100 which in turn are actuated by the piston and rod assemblies 76–78–80. Thus, when the valve spool 14 is in the right-hand position as shown in FIGURE 3, fluid is admitted to the left-hand cylinder 72 to urge the piston and rod assembly toward the right. When the thrust plate 86 carried by the left-hand piston assembly 76 engages the side walls 111 of the actuating levers 100 it oscillates them about the axle or pin 102. As the levers 100 oscillate, their angularly inclined or cam surfaces 156 engage the rollers 114 carried by the detent piston 118 to the detent piston outwardly in the cylinder 122 against the compression of spring 126. When the levers 100 oscillate to such a position that the point 157 at the ends of the levers 100 between the cam surfaces 154 and 156 passes beyond the central portion of the rollers 114, the cam surface 154 is engaged by the rollers 114 and the spring 126 urges the detent piston 118 upwardly along the surface of the cam 154 to oscillate the levers 100 in the counterclockwise direction. This gives a very quick and sharp snap action to reverse the valve spool and prevent stall; this must be avoided since the spool is balanced. The side walls 106 at the upper ends of the levers 100 engage the side wall 110 of the valve spool 14 to shift the valve spool toward the left from the position shown in FIGURE 3 to the position shown in FIGURE 4. It will be noted that there is always a slight clearance between either walls 106 and 110 or walls 107 and 112. This permits the spool 14 to be moved so that one end, carrying a land 196, substantially closes a groove 34 but leaves the valve cracked to permit fluid to enter and keep the piston assembly moving. Then, just as the cam point 157 snaps over center of rollers 114, the valve is quickly snapped, without stalling, to close that end and open the opposite end to reverse flow to the opposite cylinder.

When the valve spool 14 is in the left-hand position shown in FIGURE 4, the chamber 24 at the right-hand end of the cylinder 12 is supplied with fluid under pressure through the central bore 20, cross bore 38, metering valve 42, passageways 46, 50 and 60, and port 68, leading to the end of the right-hand cylinder 74. As the piston and rod assembly 76–78–80 moves toward the left, fluid escapes from the left-hand cylinder 72 through its metering system, to maintain the metering system flushed out. Also, as has been described with reference to the right hand side of FIGURE 3, fluid is exhausted through the associated check valve and passage system to the conduit 170 to sump.

As the piston and rod assembly moves in the left-hand direction the thrust plate 88 carried by the piston 78 engages the side wall 113 of the actuating levers 100 and oscillates the levers 100 about the pin 102 as previously described. As shown in FIGURE 4, the cam surface 154 is depressing the rollers 114 and the detent piston 118 against the resistance of the spring 126. When the pointed ends 157 of the levers 100 pass over the center of the rollers 114, the cam surface 156 take over to engage the rollers 114 and the spring 126 exerts an actuating force upwardly on the cam surface 156 to snap the levers 100 in the clockwise direction about the pin 102.

The side walls 107 at the upper ends of the levers 100 engage the shoulder 112 of the valve spool 14 to shift the spool to the extreme right-hand position, FIGURE 3, with a quick snap action. As has been previously mentioned, the exhausting cylinder is always filled with oil to exert a cushioning or balancing effect on the piston and rod assembly whereby smooth movement of the assembly is assured. Also, the chamber between the pistons is constantly full, further assuring smooth movement of the piston and rod assembly to still further provide a cushioning effect and provide a well lubricated, smoothly working construction.

*Timing adjustments*

It is to be considered within the scope of the invention to use cylinders of any desired length or capacity to increase or decrease the amount of fluid which must flow through the device to thus effect the desired control whereby time sequences provided by the device can be varied. Also, adjustment of the metering valves can be effected to provide the same or differing filling times for the cylinders, thus giving rise to versatility of the device.

*Application*

The application of this improved timing or sequencing valve is as follows. Referring to FIGURE 1 it will be noted that devices to be actuated may be connected to the conduits 220 and 222 which are respectively fluid connected to the metering valves at each end of valve casing A. As fluid flows into the appropriate cylinder through its metering valve, fluid also flows through associated outlet conduit 220 or 222 to a fluid motor to power the same.

It will thus be observed that the fluid motor is powered for the exact length of time it takes for the associated cylinder to fill before the valve snaps over center and reverses. By adjusting the metering valve the time interval can be altered, as desired.

Thus the valve of the present invention can be tied into an existing hydraulic system of a fluid motor such as a hydraulic press ram to control operation of the press in an accurately controlled time sequence and thereby dispense with expensive, elaborate and troublesome electrical or pneumatic control systems.

Applications are practically limitless, the foregoing being recited as a typical application.

I claim:

1. In a sequence valve, a valve casing, a cylinder housing, means joining said casing and said housing in fluid conducting relation, a valve bore in said casing, means for admitting fluid to said valve bore, a valve spool slidable in said bore, said spool having first and second ends with lands at each of said ends and grooves adjacent said lands with second lands closing said grooves, first and second grooves in said bore adjacent the ends thereof, said end lands being alignable with said bore grooves and being movable from one side to the other of said bore grooves upon shifting of said valve spool, exhaust ports in said bore and spaced from said bore grooves, said spool grooves being adapted to bridge said bore grooves and said exhaust ports to exhaust fluid through said valve bore, first and second cylinder bores in said housing, a piston slidable in each of said cylinder bores and a connecting rod joining said pistons for simultaneous movement, first passages between said bore grooves and respective cylinders, a metering valve in each of said first passages to meter fluid from said bore into said respective cylinders, second passages between said grooves and respective cylinders, a check valve in each of said second passages to exhaust fluid from said cylinders at desired low back pressure for smooth operation of said piston and connecting rod assembly, and a lever pivoted in said housing and having its lower end engageable by said pistons and its upper end engageable with said second valve spool lands to move said spool, whereby movement of said spool to one extreme position moves a first land between a groove and outlet passage to meter fluid into a corresponding cylinder and move the opposite land to open the other cylinder and permit fluid to be exhausted from the other cylinder by reverse flow through its metering valve and by exhaust flow through its check valve.

2. In a sequence valve, a valve casing, a cylinder housing, means joining said casing and said housing in fluid conductive relation, a valve bore in said casing, means for admitting fluid to said valve bore, a valve spool slidable in said bore, said spool having first and second ends with lands at each of said ends and grooves adjacent said lands with second lands closing said grooves, first and second grooves in said bore adjacent the ends thereof, said end lands being alignable with said grooves and being movable from one side to the other of said grooves upon shifting of said spool, exhaust ports in said bore and spaced from said bore groves, said spool grooves being adapted to bridge said bore grooves and said exhaust ports, first and second cylinder bores in said housing, a piston slidable in each of said cylinder bores and a connecting rod joining said pistons for simultaneous movement, first passages between said grooves and said respective cylinders, a metering valve in each of said first passages to meter fluid from said valve bore through each said groove into said respective cylinders, second passages between said grooves and respective cylinders, a check valve in each of said second passages to exhaust fluid from said cylinders at desired low back pressure for smooth operation of said piston and rod assembly, a lever pivoted in said housing and having lower faces engageable with said pistons, said lever having angularly related cam surfaces on the base thereof converging to a point, a spring-loaded detent roller engageable with said cam surfaces and operable to bias said lever between first and second positions, a centrally located groove in said valve spool having spaced side walls, contact surfaces on the upper end of said lever adapted to engage said side walls with clearance space between, whereby entry of fluid into one of said cylinders is effective to move the piston in said cylinder into engaging relation with said lever causing one of said lever upper contact surfaces to engage one of said side walls and urge said spool in a direction opposite from movement of said piston until said point just passes over said detent roller causing said lever to snap said spool to a reverse position.

3. The sequence valve defined in claim 2 including contact faces on the lower end of said lever, said lower contact faces cooperating with said upper contact faces to define spaced lever arms acting about a common pivot, whereby initial contact of a piston with said lever is effective to move said spool in an initial manner through a short lever arm and subsequent movement of said piston is effective to move said spool through a longer lever arm to reverse the spool with a quick snap action and thereby prevent stalling.

4. In a sequence valve, a valve casing, a cylinder housing, a cylinder bore in said housing, means joining said casing and said housing in adjacent relation, a valve bore in said casing, a valve spool movable in said valve bore, a groove in said valve bore and a groove in said spool, means for conducting fluid to said groove upon actuation of said valve spool to a first position, a piston within said cylinder bore, a first fluid conduit between said groove and said cylinder bore, a metering valve in said conduit to admit fluid from said valve bore into said cylinder bore at a metered rate to move said piston, a second fluid conduit between said groove and said cylinder bore, a check valve in said second fluid conduit, an exhaust passage in said valve bore spaced from said groove, said spool groove being adapted to bridge said exhaust passage and said bore groove, and means operable by said piston to move said spool, whereby said spool is moved to a position opening said groove to permit fluid to enter said cylinder at a metered rate and move said piston for a given time period whereafter said piston moves said spool causing said spool groove to bridge said groove and said exhaust passage whereupon reverse movement of said piston forces fluid to exhaust reversely through said metering valve to clean the same and also exhaust fluid through said check valve thus retaining fluid in said cylinder under a desired low degree of back pressure to provide smooth movement of said piston.

5. In a sequence valve, a valve casing, a cylinder housing, means joining said casing and said housing in fluid connecting relation, a valve bore in said casing, means for admitting fluid to said valve bore, a valve spool slidable in said bore, inlet passages at each end of said bore, outlet passages adjacent said inlet passages, lands on said spool movable between said inlet and outlet passages to admit fluid to said cylinders, grooves on said spool adapted to bridge said inlet and outlet passages and exhaust fluid from said cylinders, first and second cylinder bores in said housing, a piston slidable in each of said cylinder bores and a connecting rod joining said pistons for simultaneous movement, conduits connecting said inlet passages to said cylinders and conduits connecting said outlet passages to said cylinders, metering valves in said inlet passages, check valves in said outlet passages, said exhaust passages leading to a chamber between said pistons and an exhaust conduit leading from said valve casing whereby said cylinders are retained full of fluid to assure smooth movement of said cylinder-rod assembly, and means engageable by said piston for moving said spool to positions alternately filling one of said cylinders and exhausting the other.

6. In a sequence valve, a valve casing, a cylinder housing, means joining said casing and said housing in adjacent relation, a valve bore in said casing, a valve spool movable in said valve bore, means for admitting fluid to said valve bore, a groove in said valve bore and an exhaust conduit adjacent said groove, a land on said spool adapted to close said groove, a groove on said spool adjacent said land, a piston slidable in said cylinder, inlet fluid conduit means connecting said groove and said cylinder, outlet fluid conduit means connecting said valve bore groove and said cylinder, a metering valve in said inlet fluid conduit means, a check valve in said outlet fluid conduit means, a lever pivoted in said housing and having one end engageable by said piston and one end engageable with a shoulder on said spool and detent means urging said lever to one of two extreme positions, whereby when said valve spool is positioned so that said groove is open, fluid flows into said cylinder to move said piston which contacts said lever, moves said lever past said detent means and snaps said lever and said valve spool to a position where said land closes said groove against inlet fluid and said spool groove bridges said valve bore groove and said valve bore exhaust conduit to permit fluid to be exhausted from said cylinder by reverse flow through said metering valve and also by flow through said check valve.

7. In a sequence valve,
a valve casing,
a cylinder housing,
means joining said valve casing and said cylinder housing in fluid-conducting relation,
a valve bore in said valve casing,
means for admitting fluid to said valve bore,
first and second cylinder bores in said cylinder housing,
a piston slidable in each of said cylinder bores and a rod connecting said pistons for simultaneous movement,
inlet passages leading from said valve bore to said cylinders,
a metering valve in each inlet passage,
exhaust passages leading from said valve bore to said cylinders and spaced from said inlet passages,
a check valve in each exhaust passage,
a valve spool slidable in said valve bore,
lands on said spool movable between said inlet and outlet passages to admit fluid to said cylinders,
grooves on said spool to bridge an inlet and outlet passage to exhaust fluid from the cylinders,
and means operable by said pistons to snap said valve spool between a position where a land is between an inlet and outlet passage to admit fluid to a cylinder and a groove bridges an inlet and outlet passage to exhaust fluid from the other cylinder and a position the reverse of the described position.

8. In a sequence valve, a valve casing, a cylinder housing, means connecting said casing and said housing in fluid conducting relation, a valve bore in said casing, a valve spool movable in said bore, first and second aligned cylinders in said housing, a piston slidable in each of said cylinders and a connecting rod joining said pistons for simultaneous movement, ports in said bore to admit fluid to one of said cylinders in a first position of said spool and exhaust fluid from the other cylinder, means to meter fluid to said cylinders in inlet position of said spool, means engageable by said cylinders to move said spool in said valve bore whereby filling of one cylinder by said valve spool causes the piston fed by said valve spool to move said other piston to exhaust fluid from its cylinder and also to move said valve spool to reverse the flow and fill the other cylinder and reverse the pistons to exhaust said first cylinder, check valves in said exhaust ports, and metering valve in said inlet ports whereby fluid is admitted to said cylinders during a specific time cycle and the exhausting cylinder is retained full of fluid under a desired but low back pressure to assure smooth movement of said piston-rod assembly.

References Cited in the file of this patent

UNITED STATES PATENTS

| | | |
|---|---|---|
| 61,916 | Barden | Feb. 12, 1867 |
| 998,563 | Badger | July 18, 1911 |
| 2,486,495 | Rider | Nov. 1, 1949 |
| 2,674,233 | Sprague | Apr. 6, 1954 |
| 3,025,838 | Klancnik | Mar. 20, 1962 |

OTHER REFERENCES

| | | |
|---|---|---|
| 110,074 | Germany | Apr. 19, 1900 |
| 84,579 | Austria | July 11, 1921 |
| 325,355 | Great Britain | Feb. 20, 1930 |